(12) United States Patent
Melamed et al.

(10) Patent No.: US 8,423,579 B2
(45) Date of Patent: Apr. 16, 2013

(54) DISAMBIGUATION OF TABULAR DATE

(75) Inventors: Boris Melamed, Jerusalem (IL); Shlomo Steinhart, Ramat Bet Shemesh (IL)

(73) Assignee: International Business Machines Corporation, Armonk, NY (US)

( * ) Notice: Subject to any disclaimer, the term of this patent is extended or adjusted under 35 U.S.C. 154(b) by 546 days.

(21) Appl. No.: 12/260,707

(22) Filed: Oct. 29, 2008

(65) Prior Publication Data

US 2010/0106750 A1 Apr. 29, 2010

(51) Int. Cl.
G06F 17/30 (2006.01)
(52) U.S. Cl.
USPC ......................................................... 707/797
(58) Field of Classification Search .................. 707/793, 707/797, 791, 803–804, 809, 759–760
See application file for complete search history.

(56) References Cited

U.S. PATENT DOCUMENTS

| | | | |
|---|---|---|---|
| 5,584,024 A | 12/1996 | Shwartz | |
| 5,781,906 A | 7/1998 | Aggarwal et al. | |
| 5,812,840 A | 9/1998 | Shwartz | |
| 6,529,915 B1 | 3/2003 | Owens et al. | |
| 6,750,864 B1 | 6/2004 | Anwar | |
| 7,296,040 B2 | 11/2007 | Cazemier et al. | |
| 7,421,445 B2 | 9/2008 | O'Neil et al. | |
| 2002/0078024 A1* | 6/2002 | Bellamy et al. | 707/1 |
| 2005/0138056 A1 | 6/2005 | Stefik et al. | |
| 2006/0161521 A1* | 7/2006 | Dettinger et al. | 707/3 |

FOREIGN PATENT DOCUMENTS

WO WO/03/021483 3/2003

* cited by examiner

*Primary Examiner* — Thu-Nguyet Le
(74) *Attorney, Agent, or Firm* — Kali Law Group, P.C.

(57) ABSTRACT

Creating data tables by identifying paths in a tree of data entities and relationships, the tree including data entities and relationships between the entities, where each of the paths originates from the same data entity, includes a terminal data entity that is at the to-many end of a one-to-many or many-to-many relationship with another data entity along the path, and includes no other of the data entities that lie along any path descending from the terminal data entity and that is at the to-many end of a one-to-many or many-to-many relationship with another of the data entities that lie along the path descending from the terminal data entity, and creating on a computer-readable medium a separate table for each of the paths, where each of the tables includes a column per each of the data entities of the path for which the table was created.

14 Claims, 5 Drawing Sheets

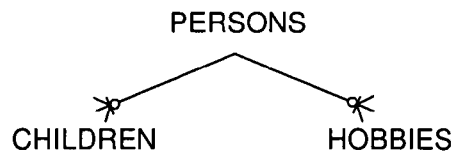

Fig. 1A

| PERSONS | PERSONS.CHILDREN | PERSONS.HOBBIES |
|---|---|---|
| Person_1 | Child_1 | Reading |
| Person_1 | Child_1 | Films |
| Person_1 | Child_1 | Cooking |
| Person_1 | Child_2 | Reading |
| Person_1 | Child_2 | Films |
| Person_1 | Child_2 | Cooking |
| Person_1 | Child_3 | Reading |
| Person_1 | Child_3 | Films |
| Person_1 | Child_3 | Cooking |

Fig. 1B

| PERSONS | PERSONS.CHILDREN | PERSONS.HOBBIES |
|---|---|---|
| Person_1 | Child_1,<br>Child_2,<br>Child_3 | Reading,<br>Films,<br>Cooking |
| Person_2 | Child_4,<br>Child_5 | Sports,<br>Music,<br>Acting |

Fig. 1C

DISAMBIGUATION OF TABULAR DATE

FIELD OF THE INVENTION

The present invention relates to computer-based representation of data in general, and more particularly to disambiguation of tabular data.

BACKGROUND OF THE INVENTION

The way that related data are represented in a tabular format sometimes runs the risk of the data being interpreted incorrectly. For example, as is shown in FIG. 1A, a data entity "Persons" is shown as having a one-to-many relationship with a data entity "Children," as well as a one-to-many relationship with a data entity "Hobbies." A Cartesian product showing a Person "Person_1" and the Children and Hobbies related to Person_1 is shown in FIG. 1B. A cursory glance at the table in FIG. 1B might lead one to interpret the data incorrectly, such as by interpreting the first record to mean that Person_1 has a child "Child_1" who has "Reading" as a hobby. Displaying the data in a slightly different way, such as is shown in FIG. 1C, is arguably just as ambiguous. In both FIG. 1B and FIG. 1C, a priori knowledge of the data relationships of FIG. 1A and/or careful attention to the column headings in both FIG. 1B and FIG. 1C are required to interpret the data unambiguously.

SUMMARY OF THE INVENTION

The present invention in embodiments thereof discloses novel systems and methods for disambiguation of tabular data.

In one aspect of the present invention a method is provided for creating tables of data, the method including identifying, in a tree representing a plurality of data entities and cardinal relationships between the data entities, a plurality of paths, where each of the paths includes a plurality of the data entities and any of the relationships between any of the data entities, where each of the paths originates from the same one of the data entities, includes a terminal data entity, being one of the data entities that terminates the path, where the terminal data entity is at the to-many end of either of a one-to-many relationship and a many-to-many relationship with another of the data entities along the path, and includes no other of the data entities that lie along any path descending from the terminal data entity and that is at the to-many end of either of a one-to-many relationship and a many-to-many relationship with another of the data entities that lie along the path descending from the terminal data entity, and creating on a computer-readable medium a separate table for each of the paths, where each of the tables includes a column per each of the data entities of the path for which the table was created.

In another aspect of the present invention the method further includes including in any of the tables a column for any of the data entities that lie along any path descending from the terminal data entity of the path for which the table was created.

In another aspect of the present invention the method further includes including in any of the tables a column for any of the data entities that lie along any path descending from any of the data entities in the path for which the table was created, where the descending path lies at least partially along paths other than the path for which the table was created, and where the data entities that lie along the descending path have one-to-one cardinality with any of the data entities along the entirety of the descending path.

In another aspect of the present invention the method further includes including any of the data entities that does not lie along any of the identified paths in a plurality of the tables.

In another aspect of the present invention the method further includes including any of the data entities that does not lie along any of the identified paths in only one of the tables.

In another aspect of the present invention a tabular data disambiguation system is provided including a core path identifier configured to identify any path within a tree of a plurality of data entities as originating from a common root data entity, including a terminal data entity terminating the path, where the terminal data entity is at the to-many end of either of a one-to-many relationship and a many-to-many relationship with any of the data entities along the path, and including no other of the data entities that lie along any path descending from the terminal data entity and that is at the to-many end of either of a one-to-many relationship and a many-to-many relationship with any of the data entities that lie along the path descending from the terminal data entity, and a table creator configured to create on a computer-readable medium a separate table for of the paths identified by the core path identifier, wherein each of the tables includes a column per each of the data entities of the path for which the table was created.

In another aspect of the present invention the system further includes a tree constructor configured to construct a tree including all of the paths in a path set, where all of the paths in the path set originate from the common root data entity.

In another aspect of the present invention any of the paths defines a traversal order from a first one of the data entities in the path to a last one of data entity in the path.

In another aspect of the present invention each of the data entities, but the last data entity, in any of the paths has a cardinal relationship with the data entity that immediately follows it.

In another aspect of the present invention a computer-implemented program is provided embodied on a computer-readable medium, the computer program including a code segment operative to identify, in a tree representing a plurality of data entities and cardinal relationships between the data entities, a plurality of paths, where each of the paths includes a plurality of the data entities and any of the relationships between any of the data entities, where each of the paths originates from the same one of the data entities, includes a terminal data entity, being one of the data entities that terminates the path, where the terminal data entity is at the to-many end of either of a one-to-many relationship and a many-to-many relationship with another of the data entities along the path, and includes no other of the data entities that lie along any path descending from the terminal data entity and that is at the to-many end of either of a one-to-many relationship and a many-to-many relationship with another of the data entities that lie along the path descending from the terminal data entity, and a code segment operative to create on a computer-readable medium a separate table for each of the paths, where each of the tables includes a column per each of the data entities of the path for which the table was created.

BRIEF DESCRIPTION OF THE DRAWINGS

The present invention will be understood and appreciated more fully from the following detailed description taken in conjunction with the appended drawings in which:

FIGS. 1A-1C are simplified illustrations of related data entities and tabular data therefor, useful in understanding the present invention;

DETAILED DESCRIPTION OF THE INVENTION

Figure 2A:
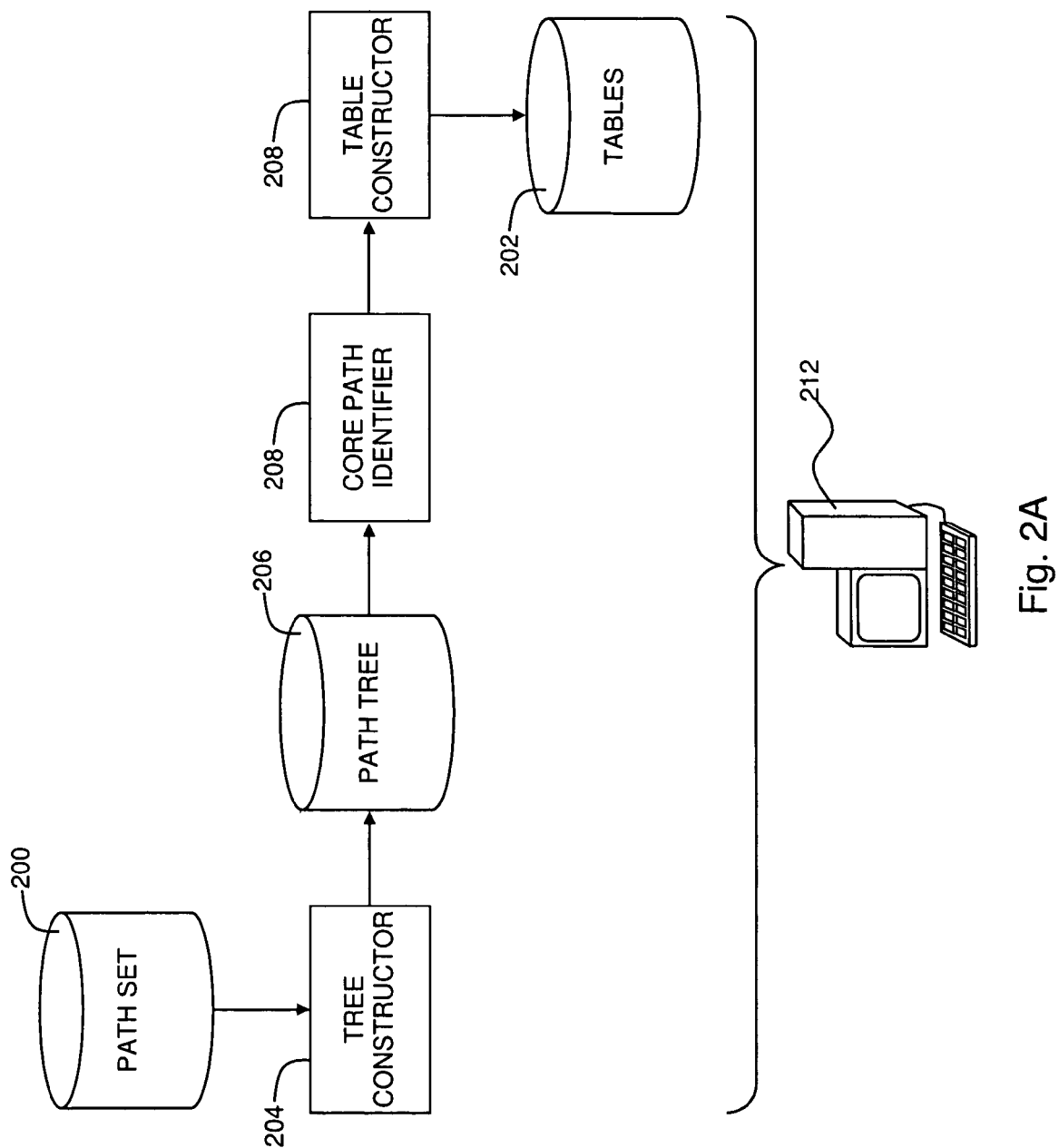
FIG. 2A is a simplified conceptual illustration of a tabular data disambiguation system, constructed and operative in accordance with an embodiment of the present invention.

The present invention is now described within the context of one or more embodiments, although the description is intended to be illustrative of the invention as a whole, and is not to be construed as limiting the invention to the embodiments shown. It is appreciated that various modifications may occur to those skilled in the art that, while not specifically shown herein, are nevertheless within the true spirit and scope of the invention.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the internet or an intranet, or a magnetic storage device. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wire line, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Reference is now made to FIG. 2A, which is a simplified conceptual illustration of a tabular data disambiguation system, constructed and operative in accordance with an embodiment of the present invention. In the system of FIG. 2A, a set 200 of two or more paths of data entities is defined, where a path defines a traversal order from the first data entity in the path to the last data entity in the path, and where every data entity in the path but the last data entity has a cardinal relationship with the data entity that immediately follows it. For example, in a set containing the paths "Persons.Children.Teachers" and "Persons.Friends.Spouses," the path "Persons.Children.Teachers" defines a path from a root data entity "Persons" to a data entity "Children," with which "Persons" has an m→n cardinality, and from the data entity "Children" to a data entity "Teachers," with which "Children" has an m→n cardinality. Each path in the set has the same root data entity, being the first data entity in each path. The path set may, for example, be defined as part of a query, where the values of each data entity in a path are to be presented in a table, with each data entity in the path corresponding to a different column of the table.

Once path set 200 has been defined, one or more tables 202 are defined such that the values of all of the data entities in all of the paths may be presented in the tables in a way that prevents the incorrect interpretation of the data that was described hereinabove with reference to FIGS. 1B and 1C. A tree constructor 204 constructs a single tree 206 including all of the paths in path set 200, where all of the paths in the path set originate from their common root data entity. A core path identifier 208 identifies each "core path" in tree 206, where a core path is defined as any path in the tree that originates from the root data entity, terminates at a data entity that is at the to-many end of a one-to-many relationship or a many-to-many relationship with another data entity along the path, and includes no other data entity along any path descending from the terminal data entity that is at the to-many end of a one-to-many relationship or a many-to-many relationship with another data entity along the path descending from the terminal data entity. The terminal data entity of a core path need not be a leaf of the tree. A table creator 210 then creates a separate table in tables 202 for each core path identified, where each column of a table corresponds to a different data entity in the table's associated core path. Each table preferably also includes columns corresponding to any data entities that lie along any path descending from the terminal data entity of the core path. If there are any paths that descend from any data entity in a core path, other than along the core path itself, and whose data entities have one-to-one cardinality along the entirety of the path, any data entities from such paths may also be included as columns in the table associated with the core path. Such data entities are said to be in the "neighborhood of singularity" of the core path data entity from which they descend. Once tables 202 have been defined, the rows and columns of each table in tables 202 may be populated with data from the data entities represented in the table using any known technique.

Any of the elements shown in FIG. 2A are preferably executed by or otherwise made accessible to computer 212, such as by implementing any of the elements shown in FIG. 2A in computer hardware and/or in computer software embodied in a computer-readable medium in accordance with conventional techniques.

Figure 2B:
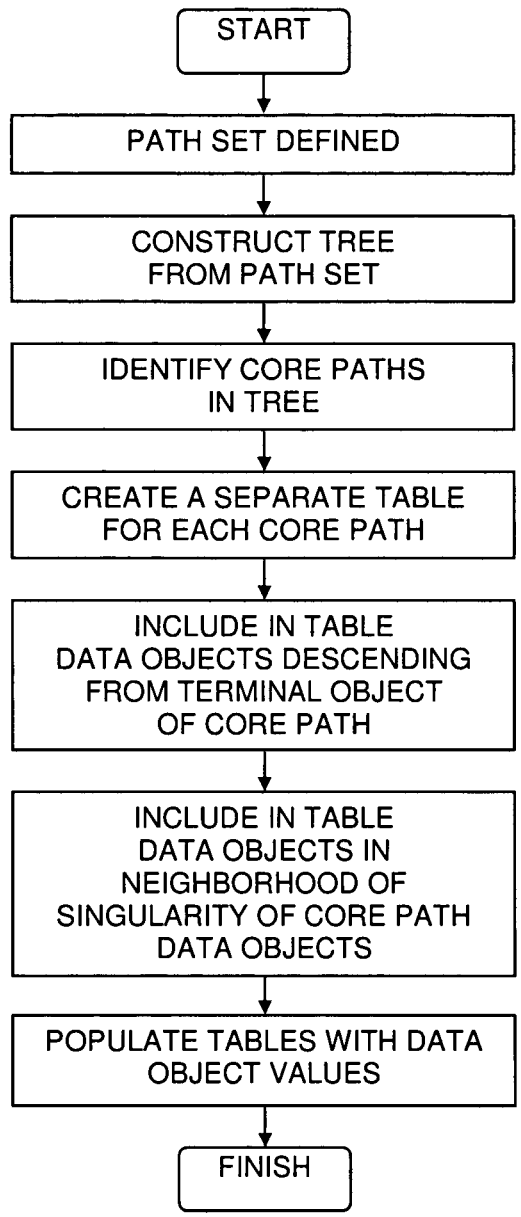
FIG. 2B is a simplified flowchart illustration of an exemplary method of operation of the system of FIG. 2A, operative in accordance with an embodiment of the present invention.

Reference is now made to FIG. 2B, which is a simplified flowchart illustration of an exemplary method of operation of the system of FIG. 2A, operative in accordance with an embodiment of the present invention. In the method of FIG. 2B, a set of two or more paths of data entities is defined, where a path defines a traversal order from the first data entity in the path to the last data entity in the path, and where every data entity in the path but the last data entity has a cardinal relationship with the data entity that immediately follows it. Each path in the set has the same root data entity, being the first data entity in each path. Once the path set has been defined, a single tree is constructed including all of the paths in the path set, where all of the paths in the path set originate from their common root data entity. Each core path in the tree is identified. A separate table is then created for each core path identified, where each column of a table corresponds to a data entity in its associated core path. Each table preferably also includes columns corresponding to any data entities that lie along any path descending from the terminal data entity of the core path. Any data entities in the neighborhood of singularity descending from any data entity in a core path may also be included as columns in the table associated with the core path. Once the tables have been defined, the rows and columns of the tables may be populated with data from the data entities represented in the table using any known technique.

Figure 2C:
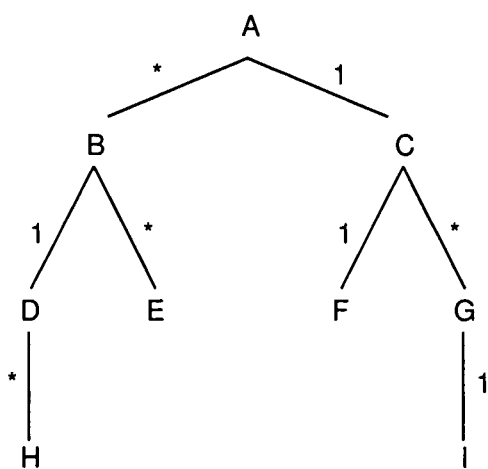
FIG. 2C is a simplified graphical illustration of an exemplary data entity tree, constructed and operative in accordance with an embodiment of the present invention.
Figure 3:
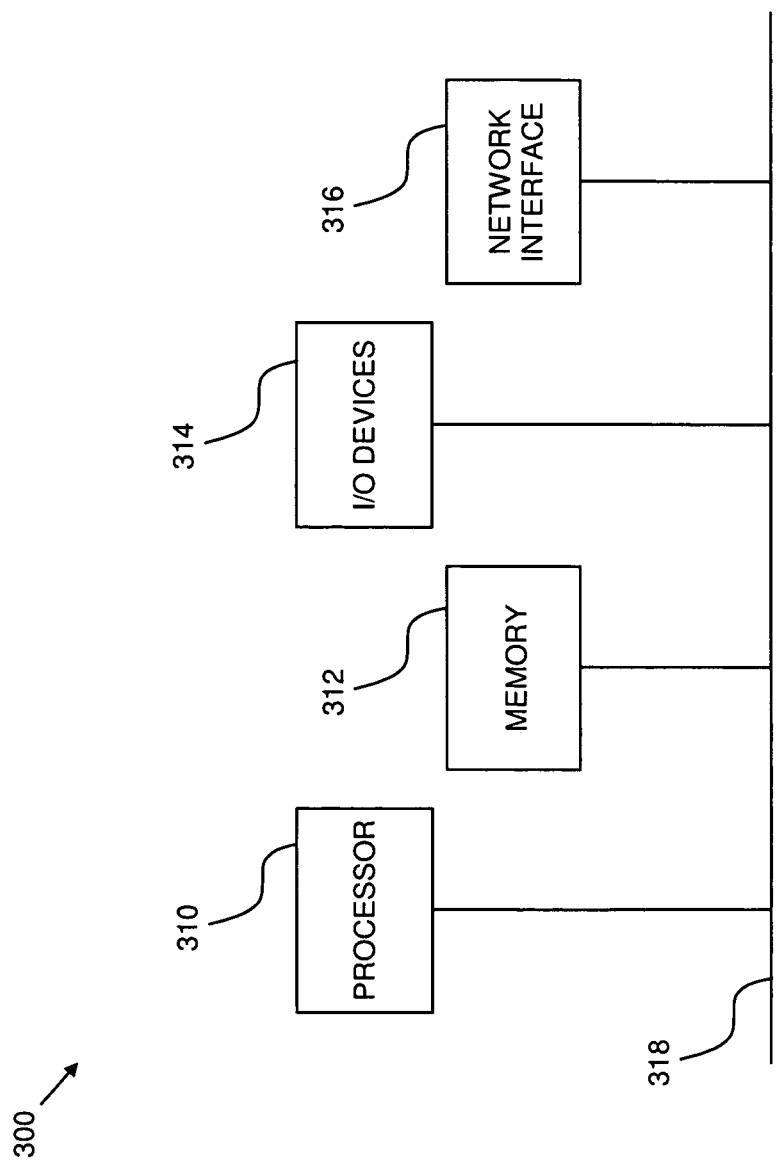
FIG. 3 is a simplified block diagram illustration of an exemplary hardware implementation of a computing system, constructed and operative in accordance with an embodiment of the present invention.

The method of FIG. 2B may also be understood in the context of the following example, where a path set for the data entities {A, B, C, D, E, F, G, H, I} is defined as having the following paths:
1) A.B
2) A.B.D.H
3) A.B.E
4) A.C.F
5) A.C.G.I A single tree is constructed including all of the paths in the path set, resulting in the tree shown in FIG. 2C, in which the cardinalities of the relationships between the data entities are also shown, with a "1" representing n→1 cardinality, and a "*" representing n→many cardinality. The core paths in the tree are thus
1) A.B.D.H
2) A.B.E
3) A.C.G as the terminal data entity in each of the core paths (i.e., E, G, and H) is at the to-many end of a one-to-many relationship or a many-to-many relationship, and includes no other data entity along any path descending from the terminal data entity that is at the to-many end of a one-to-many relationship or a many-to-many relationship. A separate table is created for each core path identified, where the columns of a table are made up of the data entities in its associated core path, resulting in the following tables:
Table 1, columns A, B, D, H
Table 2, columns A, B, E
Table 3, columns A, C, G
Since a table may also include any data entities along any path descending from the terminal data entity of its associated core path, Table 3 may also include data entity I, resulting in the following tables:
Table 1, columns A, B, D, H
Table 2, columns A, B, E
Table 3, columns A, C, G, I
Finally, a table may also include any data entities in the neighborhood of singularity descending from any data entity in the associated core path. Each of the core paths includes such data entities as follows:
1) A.B.D.H: C.F descends from A
2) A.B.E: C.F descends from A
3) A.C.G: C.F descends from A, F descends from C, I descends from G
Thus, the tables may include additional columns as follows:
Table 1, columns A, B, C, D, F, H
Table 2, columns A, B, C, E, F
Table 3, columns A, C, F, G, I
A data entity that does not lie along any core path but that may be included in more than one table as described above may be included in each of the tables, as C and F are included in each of the tables above, or may be included in only one of the tables, such that it is not repeated. Thus, for example, C and F may be included only in Table 3 as follows:
Table 1, columns A, B, D, H
Table 2, columns A, B, E
Table 3, columns A, C, F, G, I Referring now to FIG. 3, block diagram 300 illustrates an exemplary hardware implementation of a computing system in accordance with which one or more components/methodologies of the invention (e.g., components/methodologies described in the context of FIGS. 2A-2B) may be implemented, according to an embodiment of the present invention.

As shown, the techniques for controlling access to at least one resource may be implemented in accordance with a processor 310, a memory 312, I/O devices 314, and a network interface 316, coupled via a computer bus 318 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the methods and apparatus herein may or may not have been described with reference to specific computer hardware or software, it is appreciated that the methods and apparatus described herein may be readily implemented in computer hardware or software using conventional techniques.

While the present invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A computer implemented method for creating tables of related data, the method comprising:
    identifying in a single tree representing all of a plurality of data entities and all cardinal relationships between said data entities, and all of a plurality of core paths, wherein each of said core paths includes a plurality of said data entities and any of said cardinal relationships between any of said data entities of the related data, wherein
    each of said core paths, originates from a common root data entity, wherein the common root data entity is the same one of said data entities, wherein
    each of said core paths includes a terminal data entity, the terminal data entity being one of said data entities that terminates said core path, wherein said terminal data entity is at a to-many end of a many-to-many relationship with another of said data entities along said core path, and wherein
    each of said core paths includes no other of said data entities that lie along any non-core path descending from said terminal data entities, and
    creating on a computer-readable medium a separate table for each of said core paths, wherein each of said tables includes a column for each of said dam entities of said core path for which said table was created such that all of the data entities in all of the core paths are unambiguously presented in the tables.

2. The method according to claim 1 and further comprising:
    including in any of said tables a column for other of said data entities that lie along any non-core path descending from said terminal data entity of said core path for which said table was created, such that the terminal data entity is not a leaf.

3. The method according to claim 1 and further comprising:
    including in any of said tables a column for other of said data entities that lie along any singularity path descending from any of said data entities other than the terminal data entity in said core path for which said table was created, wherein said descending singularity path lies at least partially along paths other than said core path for which said table was created, and wherein said data entities that lie along said descending singularity path have one-to-one cardinality with any of said data entities along the entirety of said descending singularity path.

4. The method according to claim 1 and further comprising:
    including any of said data entities that does not lie along any of said identified core paths in a plurality of said tables.

5. The method according to claim 1 and further comprising:
    including any of said data entities that does not lie along any of said identified core paths in only one of said tables.

6. A tabular data disambiguation system comprising:
    a computer processing device;
    a core path identifier configured to identify any core path within a single tree of a plurality of data entities as, wherein
        the core path originates from a common root data entity,
        including a terminal data entity terminating said core path, wherein said terminal data entity is at a to-many end of a many-to-many relationship with any of said data entities along said core path, and wherein
        the core path includes no other of said data entities that lie along any non-core path descending from said terminal data entity; and
    a table creator configured to create on as computer-readable medium a separate table for of said core paths identified by said core path identifier, wherein each of said tables includes a column for each of said data entities of said core path for which said table was created such that all of the data entities in all of the core paths are unambiguously presented in the tables.

7. The system according to claim 6 and further comprising a tree constructor configured to construct a tree including all of the core paths in a path set, wherein all of said core paths in said path set originate from said common root data entity.

8. The system according to claim 6 wherein any of said core paths defines a traversal order from a first one of said data entities in said core path to a last one of data entity in said path.

9. The system according to claim 6 wherein each of said data entities, but the last data entity, in any of said core paths has a cardinal relationship with the data entity that immediately follows it.

10. The system of claim 6, further comprising including in any of said tables a column for other of said data entities that lie along any non-core path descending from said terminal data entity of said core path for which said table was created, such that the terminal data entity is not a leaf.

11. The system of claim 6, further comprising including in any of said tables a column for other of said data entities that lie along any singularity path descending from any of said data entities other than the terminal data entity in said core path for which said table was created, wherein said descending, singularity path lies at least partially along paths other than said core path for which said table was created, and wherein said data entities that lie along said descending singularity path have one-to-one cardinality with any of said data entities along the entirety of said descending singularity path.

12. A computer-implemented program embodied on a non-transitory computer-readable medium, the computer program comprising:

a code segment operative to identify, in a single tree representing a plurality of data entities and cardinal relationships between said data entities, a plurality of core paths, wherein each of said core paths includes a plurality of said data entities and any of said cardinal relationships between any of said data entities, wherein each of said core paths originates from a common root data entity, wherein the common root data entity is the same one of said data entities, and wherein each of said core paths includes a terminal data entity, the terminal data entity being one of said data entities that terminates said core path, wherein said terminal data entity is at a to-many end of a many-to-many relationship with another of said data entities along, said core path, and wherein each of said core paths includes no other of said data entities that lie along any non-core path descending from said terminal data entity; and a code segment operative to create on the non-transitory computer-readable medium a separate table for each of said core paths, wherein each of said tables includes a column for each of said data entities of said core path far which said table was created.

13. The computer program of claim 12, further comprising including in any of said tables a column for other of said data entities that lie along any non-core path descending from said terminal data entity of said core path for which said table was created, such that the terminal data entity is not a leaf.

14. The computer program of claim 12, further comprising including in any of said tables a column for other of said data entities that lie along any singularity path descending from any of said data entities other than the terminal data entity in said core path for which said table was created, wherein said descending singularity path lies at least partially along paths other than said core path for which said table was created, and wherein said data entities that lie along said descending singularity path have one-to-one cardinality with any of said data entities along the entirety of said descending singularity path.

* * * * *